No. 729,735. Patented June 2, 1903.

UNITED STATES PATENT OFFICE.

ADOLF CLEMM AND WILHELM HASENBACH, OF MANNHEIM, GERMANY.

PROCESS OF MANUFACTURING SULFURIC ANHYDRID.

SPECIFICATION forming part of Letters Patent No. 729,735, dated June 2, 1903.

Application filed April 1, 1901. Serial No. 53,916. (No specimens.)

*To all whom it may concern:*

Be it known that we, ADOLF CLEMM and WILHELM HASENBACH, subjects of the Emperor of Germany, and residents of Mannheim, Germany, have invented certain new and useful Improvements in Processes of Manufacturing Sulfuric Anhydrid, of which the following is a specification.

This invention relates to an improvement in the process described in the specification forming part of the application for United States Letters Patent of December 31, 1901, Serial No. 690,133, for improvements in the manufacture or production of sulfuric anhydrid and means to be employed therein, the present invention consisting in the substitution for ferric oxid by copper oxid, chrome oxid, or a mixture of these oxids or the sulfates formed thereby, said oxids or their sulfates being used as contact substances and filtering substances for the hot roaster-gases, consisting of sulfurous acid, air, dust out of the burned ore, and possibly traces of arsenic.

The invention is carried out into practice by first leading the hot roaster-gases over copper oxid or chrome oxid or mixtures of these oxids or the sulfates formed thereby, then causing them to pass a filter of porous substances, as fibrous or felted fabrics of acid-proof and fireproof material—such as pumice-stone, asbestos, and the like—and finally leading them over or through a platinum contact substance, as fully described in the specification forming part of the above-cited prior patent.

We claim—

1. The herein-described process of manufacturing sulfuric anhydrid by first leading hot roaster-gases over a mixture of the oxids of copper and chromium then causing them to pass through a filter of porous substances and finally bringing them in contact with platinum contact substance as and for the purpose set forth.

2. The herein-described process of manufacturing sulfuric anhydrid by first leading hot roaster-gases over the oxids of copper then causing them to pass through a filter of porous substances and finally bringing them into contact with platinum contact substance substantially as and for the purpose set forth.

In testimony whereof we have signed our names to this specification in the presence of two subscribing witnesses.

ADOLF CLEMM.
WILHELM HASENBACH.

Witnesses:
H. W. HARRIS,
A. GRUMBAD.